Aug. 13, 1963  E. H. LEHMANN ETAL  3,100,427
PROJECTION DEVICE

Filed Nov. 3, 1960  5 Sheets-Sheet 1

INVENTOR.
Ernest Henry Lehmann
BY  Augustus W. Griswold

ATTORNEY

Aug. 13, 1963 E. H. LEHMANN ETAL 3,100,427
PROJECTION DEVICE
Filed Nov. 3, 1960 5 Sheets-Sheet 2

INVENTOR.
Ernest Henry Lehmann
BY Augustus W. Griswold

ATTORNEY

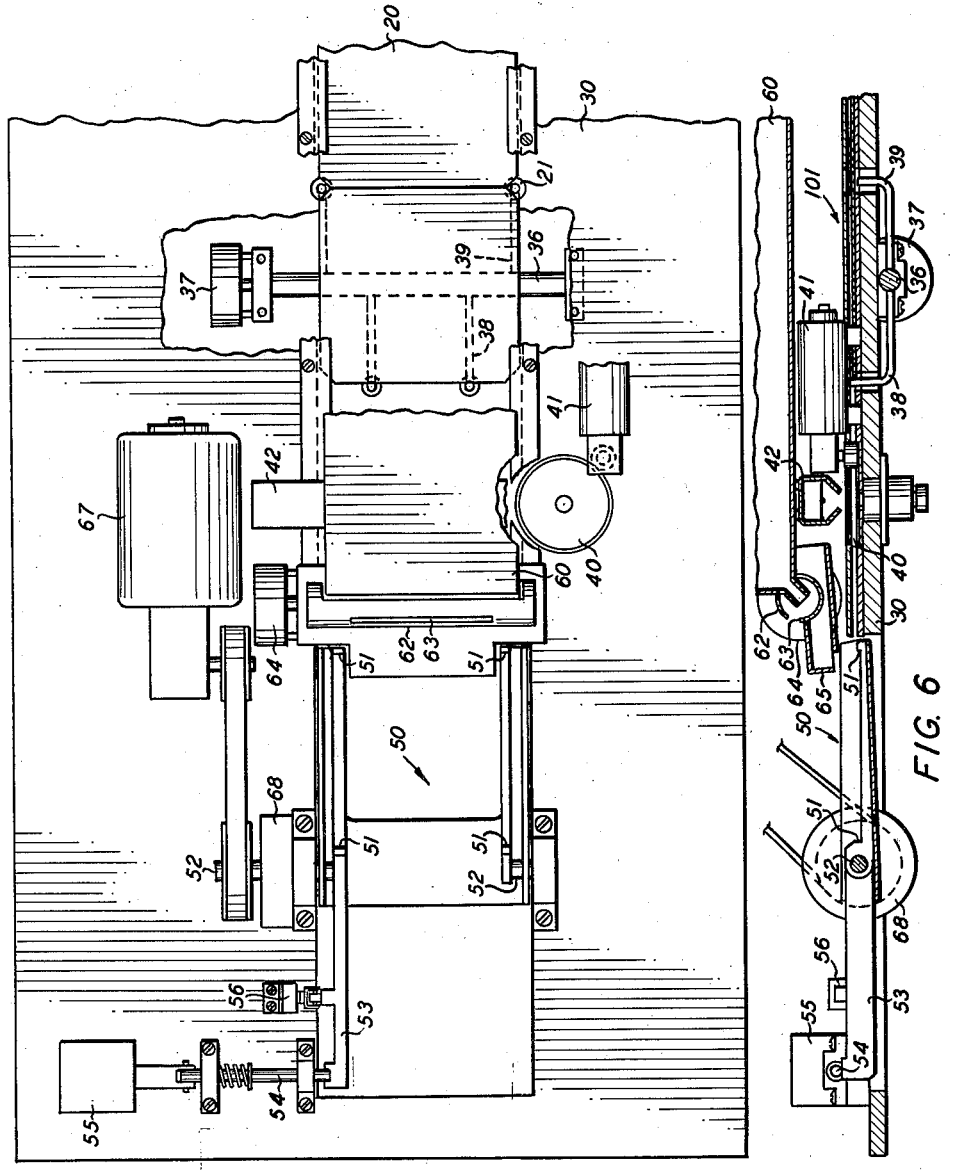

Aug. 13, 1963    E. H. LEHMANN ETAL    3,100,427
PROJECTION DEVICE

Filed Nov. 3, 1960    5 Sheets-Sheet 4

INVENTOR.
Ernest Henry Lehmann
BY Augustus W. Griswold

Stanley 3 Cole
ATTORNEY

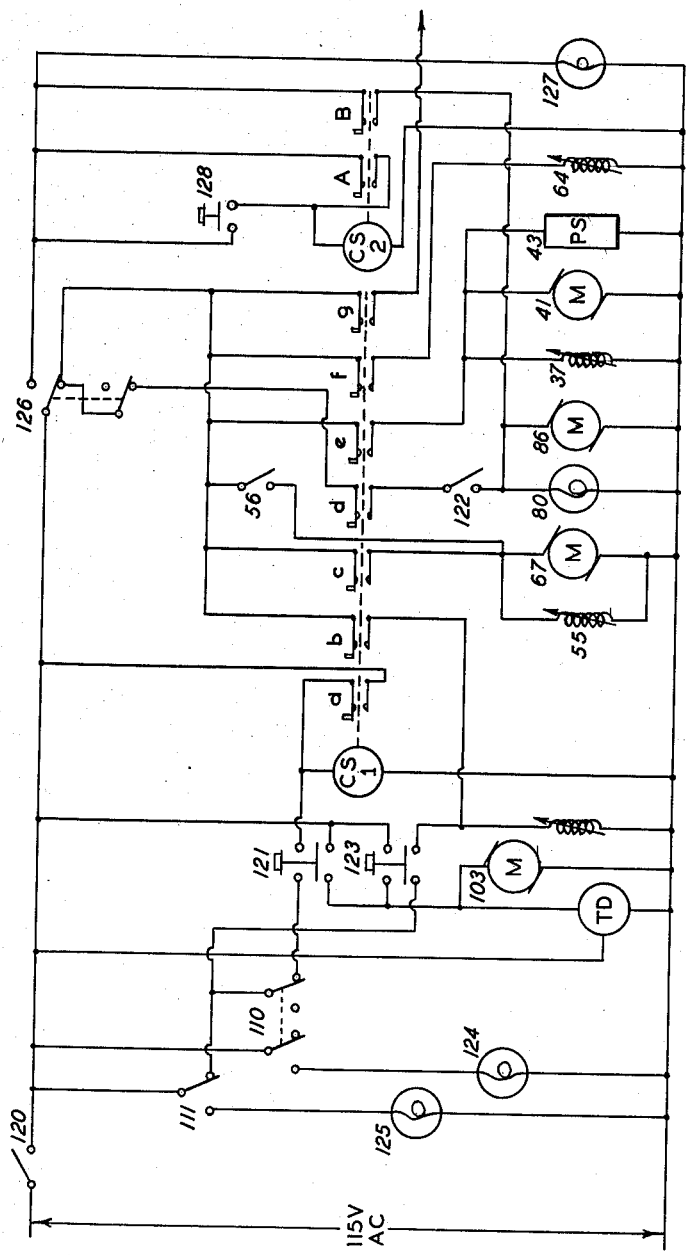

United States Patent Office 3,100,427
Patented Aug. 13, 1963

3,100,427
PROJECTION DEVICE
Ernest Henry Lehmann and Augustus W. Griswold, Rochester, N.Y., assignors to Xerox Corporation, a corporation of New York
Filed Nov. 3, 1960, Ser. No. 67,049
7 Claims. (Cl. 95—1.7)

This invention relates to xerography and more particularly to improved xerographic processing and projection apparatus.

In the most usual form of xerography a xerographic plate bearing a photoconductive insulating layer is uniformly electrostatically charged and then exposed to a suitable image pattern of light and shadow which selectively dissipates the electrostatic charge in illuminated areas thereby forming on the xerographic plate an electrostatic charge pattern corresponding in configuration to the original image pattern. This charge pattern may then be developed or made visible by the selective attraction thereto of electrostatically attractable material. This visible pattern may be examined on the xerographic plate, transferred to a sheet of paper to form a permanent record, or be utilized in various other ways.

A recently discovered method of utilizing a developed image on a xerographic plate, more fully set forth in copending application Serial No. 738,520, filed May 28, 1958, involves projecting the image onto a screen or the like through utilization of the specular reflectivity of the xerographic plate. By this method, known as PROXI (Projection by Reflection of Xerographic Images), it is possible to make large, brilliant projections of small xerographic images which may have been formed in response to very feeble original image patterns. Effective utilization of the PROXI method requires suitable automatic or semi-automatic apparatus for processing and projecting the xerographic plate. Such forms of apparatus are known but generally involve the use of a xerographic plate in the form of a rotatable cylinder. A cylindrical plate has drawbacks as an object from which a projected image is to be formed. For optical reasons the presently preferred form of xerographic plate for this application would be a flat and rigid xerographic plate. Such a plate would offer the additional advantage that selected image bearing plates could readily be stored and re-projected at any time while still permitting the formation and immediate projection of other images on other, separate, xerographic plates.

It is accordingly a principal objective of the present invention to provide improved apparatus for processing and projecting flat xerographic plates. Other and subsidiary objectives will become apparent from the following description and drawings, in which:

FIGURE 5 is a view taken along line 5—5 of FIGURE 3;

FIGURE 6 is an enlarged portion of FIGURE 3;

FIGURE 10 is an electrical schematic of the machine of FIGURE 1.

As will appear more clearly below a particular machine is herein described. This has been done for the sake of clarity and without intending to limit this invention.

Identical numbers represent identical elements in all figures.

Figure 1:
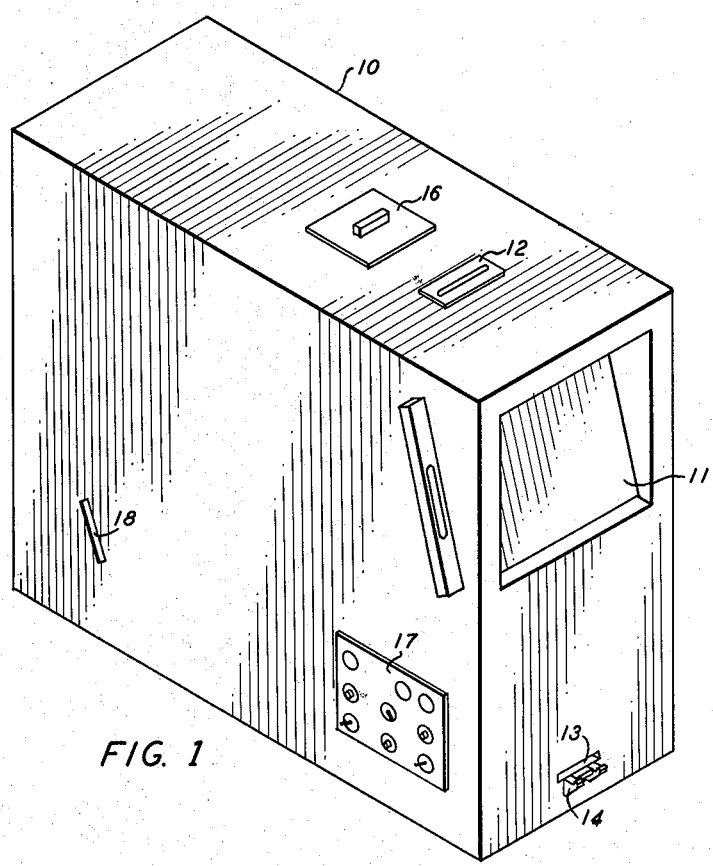
FIGURE 1 is an isometric view of the exterior of a machine which comprises an embodiment of this invention.

FIGURE 1 is an isometric view of the exterior of a xerographic apparatus according to an embodiment of the invention. A housing 10 provides a light-tight enclosure for the machine and also serves as a support of the various internal elements. A translucent projection screen 11 is transversely positioned at the upper portion of one end of the machine. Screen 11 is slidably positioned in the machine and can readily be withdrawn and replaced, if desired, with a xerographic plate holder of similar dimensions carrying a xerographic plate, with a film holder carrying a sheet of photographic film or the like. At the top of the machine there is a plate insertion slot 12 through which one or more xerographic plates may be fed into the machine. Plates may be automatically fed from a plate feed magazine or the like fitted to slot 12 or they may be manually positioned in the machine through slot 12. After processing, these plates are delivered from the machine through a plate discharge slot 13. A pair of abutments 14, positioned just outside slot 13, arrest the discharged plate and hold it until it can be lifted over the abutments and withdrawn by the operator. Automatic withdrawal means may also be employed at discharge slot 13 to withdraw and store plates. On the top of the machine an opening 15 is provided for inserting developer powder. This opening is hidden from view in this figure by a loosely fitted cover 16. A control panel 17 is incorporated in one side of the machine and provides the necessary switches, buttons, indicator lamps, and the like to control the operation of the machine. There is also provided on this side of the machine a slot 18 by which a xerographic plate, or other object of similar size, may be inserted into the machine in order to be projected upon screen 11.

Figure 2:
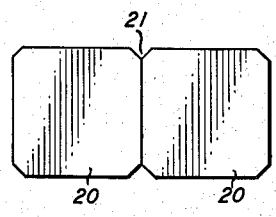
FIGURE 2 is a plan view of two xerographic plates for use with the machine of FIGURE 1.

FIGURE 2 shows two adjacent xerographic plates suitable for use in the machine of this invention. The plates are generally square in shape with their corners cut off at a 45 degree angle. Thus, when two plates are brought against each other, as shown, notches 21 are formed by the missing corners of the plates. Plates 20 comprise a rigid electrically conductive member upon which is coated a layer of photoconductive insulating material having the surface property of specular reflectivity. For illustrative purposes only, suitable plates comprise pieces of aluminum about 4 inches square and .052 inch thick upon which is coated a layer of vitreous selenium about 20 microns thick and typically having a coefficient of specular reflection of about 25%. Other materials, thicknesses, and dimensions may also be used in accordance with the teachings of the art, and the above plates are described for purposes of illustration rather than limitation.

Figure 4:
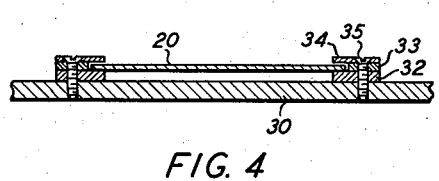
FIGURE 4 is a sectional view along line 4—4 of FIGURE 3.
Figure 3:
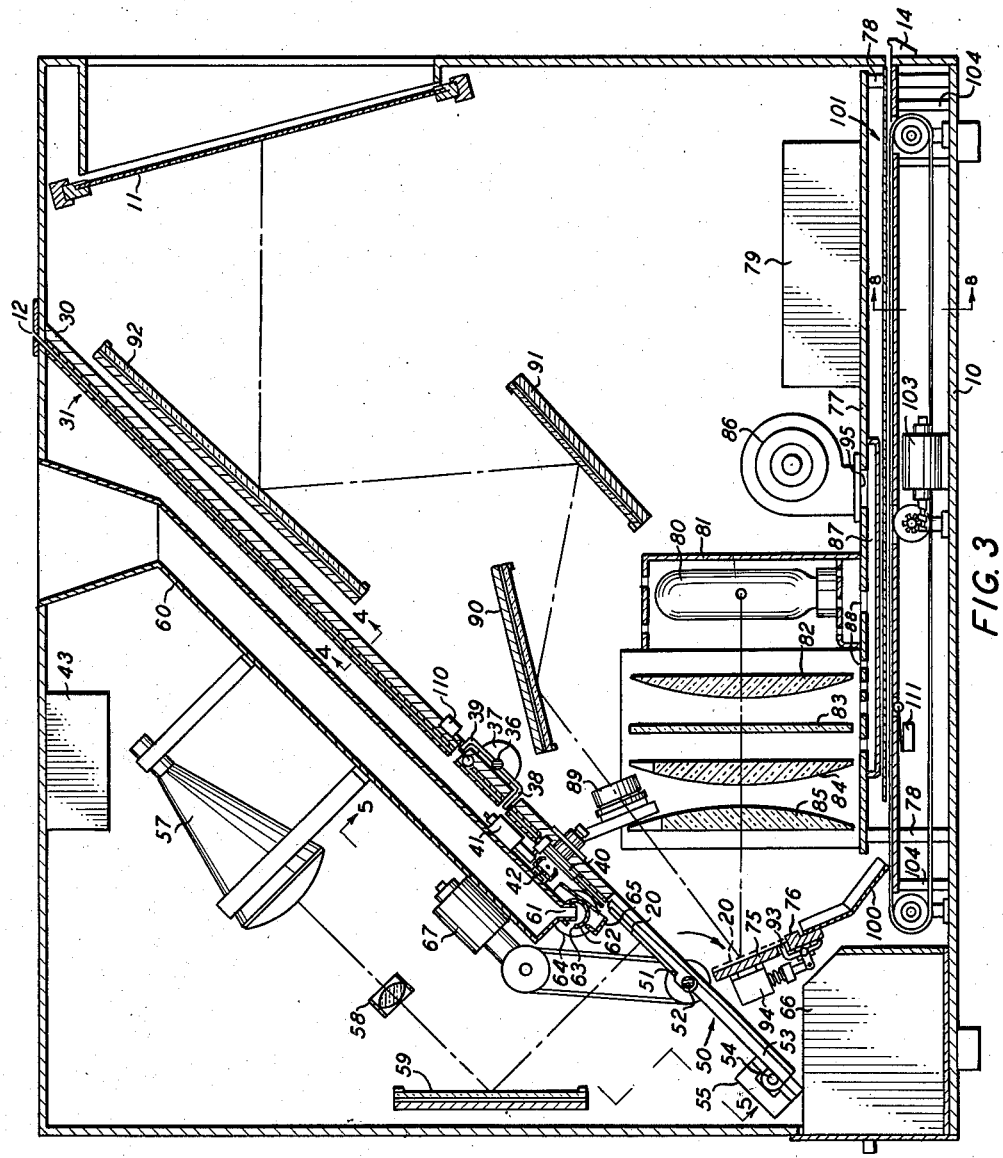
FIGURE 3 is a side sectional view of the machine of FIGURE 1.
Figure 7:
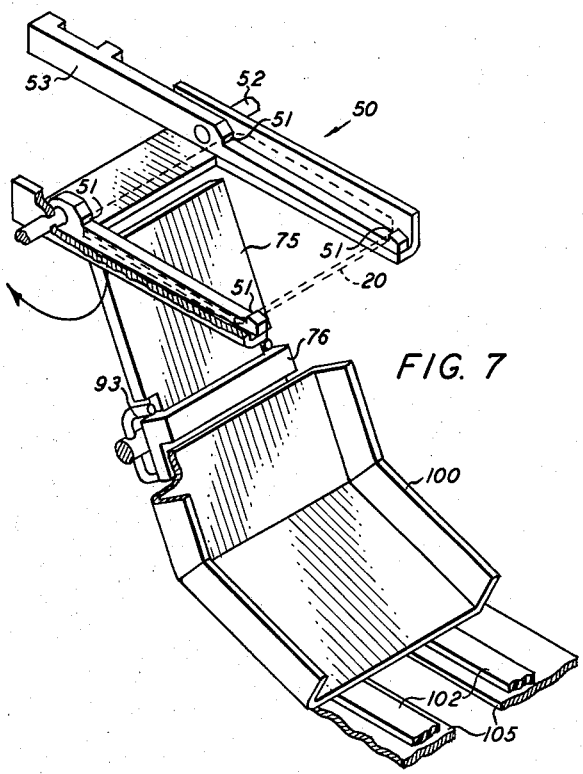
FIGURE 7 is an isometric view showing certain elements of FIGURE 3.

FIGURE 3 is a side sectional view of the machine and together with related FIGURES 5, 6, 7 and 8 shows substantially all the internal mechanical elements of the machine. Included within the machine is a partition plate 30 which extends the width of the machine, is downwardly inclined at a 45 degree angle and has its upper end positioned adjacent to plate insertion slot 12. Partition plate 30 carries on its upper surface a pair of guide tracks 31 which are adapted to receive xerographic plates and permit plates in position to slide downwardly into the machine by gravity. Plates are inserted with the selenium coated side facing upwards in slot 12. Guide tracks 31 are shown in cross section in FIGURE 4. Each track comprises a guide strip 32 about ⅛ inch thick, a spacer strip 33 which is only slightly thicker than xerographic plate 20 and a guard strip 34. Strips 32, 33 and 34 are fastened to each other and to partition plate 30 by screws 35. Guide tracks 31 thus permit plates 20 to slide downwards while confining the plates to the tracks and preventing one plate from sliding over another.

The plates are prevented from sliding completely through tracks 31 by an escapement mechanism comprising a bar 36 transversely journaled beneath partition plate 30, a rotary solenoid 37, a pair of lower L shaped rods 38 extending radially from bar 36, and a pair of upper L shaped rods 39 also extending radially outward from bar 36 in a direction opposite to that of rods 38. The portion of guide tracks 31 lying above the escapement mechanism will be referred to as the "magazine" since it is capable of holding as many as seven plates in readiness for use in the machine.

In the illustrated, or quiescent state of the escapement mechanism lower rods 38 project partially through apertures in partition plate 30 and constitute a barrier to the passage of plates. As solenoid 37 is energized, bar 36 starts to rotate in a counter clockwise direction and upper rods 32 advance through further apertures in partition plate 30 and into the notches 21 between the lowermost plate in the magazine and the next lowermost plate, if any. As bar 36 completes its allotted rotation, lower rods 38 are withdrawn below the level of guide tracks 31 and the lowermost plate is permitted to slide downwardly past rods 38 while the next lowermost plate, if any, is held against upper rods 39. As solenoid 37 is deenergized rods 38 and 39 return to their original position and any plates remaining in the magazine are permitted to slide downward in tracks 31 until the lowermost of their number is again restrained by lower rods 38. The escapement mechanism thus acts to allow one plate at a time to slide past the escapement and into further processing stations which will be described.

After leaving the escapement a plate slides downward a short distance in guide tracks 31 until an edge of the plate contacts the periphery of rubber tired wheel 40 which is journaled in partition plate 30 with its axis perpendicular thereto and so positioned that the wheel periphery presses with moderate pressure on the edge of the plate in tracks 31. As illustrated, it is necessary to cut away a portion of one of the tracks 31 in order to permit wheel 40 to contact a plate 20. Wheel 40 is contacted at another portion of its periphery by the output shaft of a gear motor 41. There is thus provided means to slowly rotate wheel 41 and thus to slowly downwardly advance a plate 20 at a uniform speed for a distance equal to its own length.

A corona charging device 42 is positioned transversely over tracks 31 at substantially the position of wheel 41 and is connected to a high voltage power supply 43 by wires not shown. Corona charging devices for xerography are well known and are fully described in the patent literature and therefore elements 42 and 43 will not be further described. When a voltage of several thousand volts is applied to corona device 42 by power supply 43 and when a plate 20 is moved uniformly past corona device 42 by wheel 40 and gear motor 41, a uniform electrostatic charge is thereby placed on plate 20.

After a plate 20 has passed out of contact with wheel 40 it is again free to slide down tracks 31 under the influence of gravity and slides off the lower ends of tracks 31 onto a transfer platen 50 which is positioned adjacent to the lower edge of partition plate 30 and the lower ends of tracks 31 and in substantial alignment therewith. Transfer platen 50 is isometrically depicted in FIGURE 7, but in a different orientation from that shown in the other figures. Platen 50 comprises a fork-like element, the two parallel arms of which are adapted to receive a xerographic plate 20 and prevent lateral motion thereof. Transfer platen 50 is also provided with a set of stops 51 adapted to prevent longitudinal motion of a plate. Transfer platen 50 is initially aligned with guide tracks 31 so that a downwardly falling plate can slide over the upper of stops 51 and be arrested by the lower of stops 51. The plate carries a pair of stub axles 52 which are journaled to permit rotation about a transverse horizontal axis located near the lower edge of a plate 20 as it sits on the platen. A rearwardly projecting arm of platen 50 contacts a retractable stop pin 54 which is operated by a solenoid 55 and which serves to positively locate the platen in the position already described and illustrated in FIGURES 3 and 6. Arm 53 also contacts a limit switch 56 whose function will be described later.

After a charged plate arrives in transfer platen 50 it is exposed to a light image projected on it by a cathode ray tube 57, a lens 58 and a mirror 59. The projected image may comprise a radar or facsimile display or it may comprise letters and symbols projected from a character generator type of cathode ray tube. Electronic equipment to operate the cathode ray tube is located outside the machine and forms no part of the invention. The cathode ray tube is shown for illustrative purposes only since other forms of apparatus such as various types of projectors for applying an image pattern of light and shadow to plate 20 are well known and may be substituted for the cathode ray tube without in any way affecting the operation of the machine.

After exposure plate 20 is developed by pouring developer powder over the plate from a developer chute 60 which is positioned above and substantially parallel to partition plate 30 and which communicates with developer insertion opening 15 by which it can be filled with developer powder. The developer powder will typically comprise a mixture of carrier particles of a diameter on the order of 20 microns together with toner particles having a diameter on the order of several microns and which are electrostatically attached to the carrier particles. Other types of developer materials are known and may likewise be employed. Several types of developer materials for use in xerography are available from Xerox Corporation, Rochester, New York and all are suitable for use in the instant machine.

The lower end of developer chute 60 terminates in a narrow nozzle 61 which is positioned slightly uphill from the upper edge of a plate 20 as it rests in transfer platen 50 and is provided with discharge valve 62 operated by a rotary solenoid 64. Valve 62 is in the form of a transverse arcuate member having a longitudinal slit 63 therein. Valve 62 is journaled for rotation about its axis in response to solenoid 64. In the normal and illustrated position of valve 62, slit 63 does not lie beneath nozzle 61 and developer powder is prevented from flowing past valve 62. When solenoid 64 is temporarily operated valve 63 is rotated so as to align slit 63 beneath nozzle 61 thereby permitting developer powder to flow through slit 63 and into a second much smaller developer chute 65 which directs the powder at the upper edge of a plate 20 as it lies in transfer platen 50. The developer powder then slides or cascades across plate 20 and is collected in receptacle 66. During the flow of developer over the plate some of toner material is detached from carrier particles by the latent electrostatic image pattern and adheres to the surface of the plate in image configuration.

Developer materials are obtainable such that the toner will selectively adhere either to the electrically charged or discharged areas of the plate. When a cathode ray tube or similar bright line image source is employed it may be desirable to select a developer material which deposits toner particles on the discharged rather than charged areas of the plate. Transfer platen 50 is provided with stub axles 52 rather than a conventional shaft since the latter would collect developer powder and/or deflect the flowing developer and scatter it about the inside of the machine.

After the plate 20 has been developed in the described manner stop pin 54 is retracted by solenoid 55 and transfer platen 50 is rotated in a clockwise direction in this view by a gear motor 67 driving one of the stub axles 52 through a slip clutch 68. As transfer platen 50 continues to rotate the plate 20 carried thereon is intercepted by a projection easel 75 which is inclined from the vertical by about 22 degrees and has a horizontal ledge 76 at its bottom. Easel 75 is narrower than the spacing between the two arms of transfer platen 50 and platen 50 is therefore free to continue rotating to its initial position while plate 20 is picked off and held by easel 75 while supported by ledge 76 thereof. This transfer procedure can be most readily visualized in connection with FIGURE 7. As platen 50 returns towards its original position gear motor 67 is deenergized by limit switch 56 but continues to coast long enough to bring rearward arm 53 into contact with stop pin 54. Slip clutch 68 permits gear motor 67 to continue coasting without causing further movement of platen 50.

Projection takes place from the surface of plate 20 while it is supported on projection easel 75. The projection light source is mounted on a support plate 77 which is positioned above the base of housing 10 by spacers 78 to permit the mounting of certain additional apparatus beneath the support plate. Support plate 77 carries certain electrical control apparatus 79 required for operating the machine in addition to certain optical elements. These elements include a 750 watt projector lamp 80 mounted in a lamp housing 81, a condensing lens 82, a sheet of heat-absorbing glass 83 and two further condensing lens 84 and 85. Elements 80 through 85 combine to project a brilliant, horizontal, and slightly converging beam of light upon the developed surface of plate 10 as it rests on easel 75. Also mounted on support plate 77 is centrifugal blower 86 which delivers downwardly through hole 95 in support plate 77 into plenum chamber 87 positioned beneath support plate 77. Transverse slots 88 are cut into support plate 77 to permit air to escape from the plenum chamber and flow past the optical elements thereby cooling them. It has been found desirable to provide air cooling in this manner for lamp 80, condenser 82 and heat-absorbing glass 83, but such cooling has not been found necessary for condensers 84 or 85.

A projection lens 89 is positioned to intercept the light specularly reflected by plate 20, but not the light diffusely scattered therefrom as a result of scattering by the powder pattern thereon. In accordance with the known laws of reflection, if plate 20 is tilted 22 degrees from the direction of incident illumination then lens 89 must be positioned at a point lying 22 degrees above a perpendicular to the plate. In other words there must be an inclined angle of 44 degrees between an imaginary line drawn from the light source to the plate and an imaginary line drawn from the plate to the lens 89. Obviously these angles will be different for other inclinations of plate 20. Where the particular configuration described above is employed it may be found necessary to cut notches in the tops of condensers 84 and 85 to accommodate projection lens 89. The condenser lens should be so adjusted that an image of lamp 80 is formed at lens 89. Light reflected from plate 20 and passed through lens 89 is reflected by mirrors 90, 91 and 92 and is then directed at translucent projection screen 11. Lens 89 should be so chosen and adjusted to focus the surface of plate 20 on screen 11. There is thus provided at screen 11 a brilliant and enlarged representation of the powder pattern on plate 20 which in turn corresponds to the smaller and weaker pattern previously projected on the plate by cathode ray tube 57. The nature of the projected image is such that powder covered areas of plate 20 appear black on screen 11 whereas uncovered portions of plate 20 appear to be the color of the light source, which is normally white. If desired a color filter may be positioned in the projected light path thus coloring the normally white projected areas.

As described above, it is possible to temporarily or permanently replace screen 11 by a sheet of film, a sensitive xerographic plate or the like in order to obtain a permanent record of the projected image.

Slot 18, illustrated in FIGURE 1, is oriented in alignment with projection easel 75 and communicates therewith. It is thus possible to insert a previously developed plate or other object of similar size onto easel 75 and to project an image of that plate or other object without necessarily going through all of the processing steps which normally are accomplished within the machine prior to projection. This flexibility in the machine allows projection and viewing of out of sequence material if desired.

After projection is completed plate 20 can be dislodged from easel 75 by a set of fingers 93 which are operated by solenoid 94 and which are adapted to project through apertures near the lower edge of easel 75 and push the lower edge of plate 20 off the supporting ledge 76. Once the lower edge of the plate is pushed off ledge 76 the plate, being unsupported, falls off the easel and slides down a chute 100 onto discharge tracks 101 which are positioned at the bottom of the machine beneath support plate 77. Belts 102, driven by gear motor 103, urge the discarded plate out of the machine and against abutments 14. When positioned against abutments 14 the plate may readily be grasped and withdrawn by the operator or automatic pickup means may be provided to store the plate or to further process the plate and prepare it for recycling.

Figure 8:
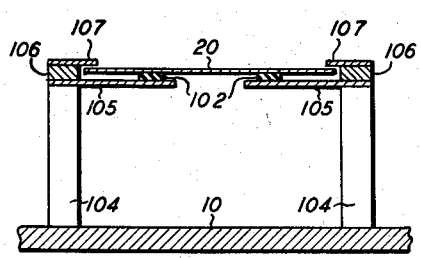
FIGURE 8 is a section along line 8—8 of FIGURE 3.

FIGURE 8 is a cross section through tracks 101 showing the tracks and belt mechanism in somewhat greater detail. As shown the tracks are carried by support members 104 which support at their upper ends guide strips 105 which in turn support the upper flights of belts 102. Positioned above guide strips 105 by spacers 106 are guard strips 107. As shown plates 20 ride on the upper surface of belts 102 and are restrained from lateral movement by spacers 106. The thickness of spacers 106 is chosen in relation to the thickness of belts 102 and plates 20 so that plates 20 just clear the lower surface of guard strips 107. Plates 20 are thus readily carried along discharge tracks 101 by the motor driven belts yet it is impossible for one plate to slide over another in the tracks, thereby causing a jam. Since the plates rest lightly on belts 102 the belts may continue to move without damage to themselves or to the plates when one or more plates are stopped by abutments 14.

Also included within the machine and not previously described are limit switches 110 and 111. Limit switch 110 is positioned beneath partition plate 30 with its operating element projecting therethrough so that it is actuated whenever a plate rests against lower rods 38 on tracks 31. Limit switch 111 is positioned beneath discharge tracks 101 at the position indicated and is actuated whenever a plate is over it. The function of these switches will be described later in connection with the electrical control circuits.

The functional operation of the machine will now be described before passing to a detailed description of the electrical circuitry whereby this is accomplished. Operation of the machine is started by pouring a supply of developer powder into opening 15 and by inserting from one to seven plates, photoconductive side upwards, into slot 12. The escapement mechanism is then operated to drop a single plate into contact with the rubber tired drive wheel which drives at a uniform speed past the simultaneously energized corona charging device from which it receives an electrostatic charge. The plate then drops onto the transfer platen where it is exposed by the cathode ray tube and developed by momentarily allowing developer powder to issue from the developer chute and pour over the plate. The transfer platen is then rotated in order to transfer the plate to the projection easel and the projection lamp is turned on in order to project an image of the plate onto the viewing screen. When it is desired to project a different image the projection lamp is turned off, the plate is kicked off the easel and carried out of the machine by the discharge conveyor. At the same time a new plate is released by the escapement mechanism and goes through the operations previously described until it reaches the projection easel, at which point the projection lamp is again turned on.

Figure 9:
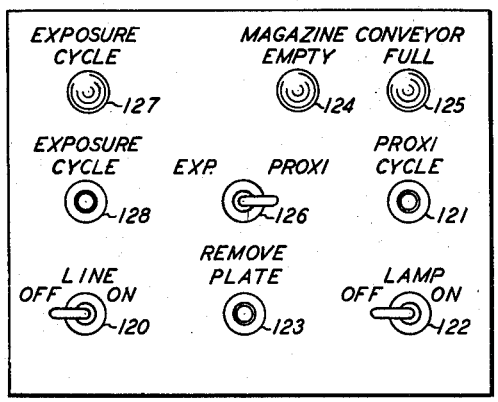
FIGURE 9 shows the control panel of the machine of FIGURE 1.

FIGURE 9 shows the control panel 17 by which the various functions of the machine may be controlled by the operator. A toggle switch 120 is provided as a main dis-connect switch for the incoming electrical power. A starting push button 121 initiates the operation of the machine when depressed, and causes the machine to automatically perform the cycle of operations previously described. A separate toggle switch 122 permits the operator to extinguish lamp 80, which would otherwise burn continuously between operating cycles. Push button 123 causes solenoid 94, gear motor 103 and belts 102 to operate independently of the machine cycle as may be required when several plates at a time are to be removed from the machine or when a plate on easel 75 is to be removed without starting a new processing cycle. A pilot lamp 124 is connected to limit switch 110 and lights whenever the magazine is empty of plates. A second pilot lamp 125 is connected to limit switch 111 and lights momentarily during each processing cycle but remains lit only when discharge tracks 101 are full and can accept no further plates. The machine is wired so that push button 121 is inoperative unless there is a plate in the magazine and room for another plate in discharge tracks 101. Therefore, if the machine should fail to operate when push button 121 is depressed, the operator can determine the reason for such failure by inspecting pilot lamps 124 and 125. The control panel also has a toggle switch 126 which is normally left in the position shown, and in which position the various other controls operate as described. When switch 126 is moved to the left the previously described switches and buttons become inoperative and a pilot lamp 127 lights to indicate this fact to the operator. When switch 127 is moved to the left push button 128 becomes operative. Pushing this button causes projection lamp 80 to turn on and remain on for a short, predetermined time. Switch 126 and button 128 are used when projection screen 11 has been replaced with a piece of film or the like and it is desired to expose the film to the projected image for a predetermined time without performing any of the other process steps which would prevent the projected image from subsequently being viewed again on screen 11.

FIGURE 10 is a diagram showing the electrical control circuits which control the operation of the machine. All of the elements of the diagram have already been described and noted with the exception of a time delay relay TD and two multiple cam switches CS1 and CS2. These latter elements are physically located on support plate 77 at the location indicated by reference number 79. The cam switches are standard commercial items and comprise a clock type motor driving a shaft with a set of adjustable cams, each cam operating a separate microswitch.

As shown, switch 120 cuts off all electrical power to the machine when in the open position. Limit switch 111 is a single pole double throw switch which energizes lamp 125 when in position corresponding to fully loaded discharge tracks 101. Limit switch 110 is a double pole switch, one pole of which is used to energize pilot lamp 124 when the magazine is empty. Push button 121 is a double pole switch, one pole of which is energized only when limit switches 110 and 111 are in appropriate positions and the other pole of which is directly energized from the A.C. line. Depressing push button 121 momentarily energizes gear motor 103 and also energizes time delay relay TD which then keeps motor 103 running for about 15 seconds. If and only if limit switches 110 and 111 are properly positioned, depressing push button 121 will also energize cam switch CS1 which will start to turn. As soon as CS1 starts to turn contact "a" closes and serves to keep the switch turning for a full rotational cycle. As CS1 rotates, the various other contacts identified as "b through g," initiate the various machine functions in proper sequence as controlled by adjustment of their respective cams. Contact "b" controls the operation of solenoid 94 which removes plates from easel 75. Contact "c" is used to momentarily energize the transfer platen gear motor 67 and the stop pin operating solenoid 55. As previously described, the further operation of these elements is then controlled by limit switch 56. Contact "d" operates lamp 80 and fan 86 simultaneously; contact "e" operates high voltage power supply 43, the plate driven gear motor 41 and escapement solenoid 37 together, and contact "f" operates the developer control solenoid 64. A final contact "g" is used to drive an appropriately timed signal to operate the external apparatus which energizes cathode ray tube 57. This signal is available on the wire indicated as Y.

It will be noted that switch 126 must be in the indicated position if cam switch CS1 is to carry out any of the above indicated functions. When switch 126 is in the alternate position power is removed from the contacts of cam switch CS1 and directed instead to a second cam switch CS2. Operating push button 128 momentarily energizes the drive motor of CS2 and continued energization of the switch motor for a complete revolution is then provided through contact A. Contact B then operates lamp 80 for a length of time which can be controlled through adjustment of the cam associated with contact B. There is also provided a double pole push button switch 123 which is adapted to operate gear motor 103 through one contact and to operate solenoid 94 through the other contact which contact is operative only when limit switch 111 indicates that discharge tracks are not full. A toggle switch 122 is also connected so as to prevent, when desired, the operation of lamp 80 except as controlled by cam switch CS2.

In the control circuit as described above initiation of each machine cycle must be initiated by an operator actually at the machine and cathode ray tube 57 is energized during a fixed portion of the machine cycle. In many cases however, it will be desirable to manually operate the machine from a remote position or else to automatically operate the machine from external apparatus such as that used to create the information which is portrayed on the cathode ray tube. The machine can be readily adapted to such operation in many ways, the simplest of which is to replace push button 121 with a two pole relay which can then be operated by any suitable external control signal.

In accordance with the described operation of the machine the xerographic plates are manually removed from the machine after they have been used for projection and these may then be wiped clean with a piece of absorbent cotton and reinserted into the machine or else new plates may be inserted. Similarly, when all of the developer material has fallen into receptacle 66 it may be manually returned to developer chute 60 or new developer may be added. However, automatic plate cleaning means such as rotating fur brushes are well known and may be incorporated in the machine as, for example, above tracks 101. Similarly, conveyors for recycling the developer powder are widely used in xerographic machines and such a conveyor could be incorporated to return developer from receptacle 66 to developer chute 60. Likewise, conveyor means could be incorporated, if desired, to carry plates from tracks 101 back to insertion slot 12.

Although this invention has been described in terms of a specific embodiment for illustrative purposes and to better permit those skilled in the art to duplicate applicants' results, it will be understood that numerous equivalents exist and are known to the art for various of the elements and components incorporated in the machine and that use thereof may readily be embodied in the instant machine without departing from the concept of the instant invention. It is accordingly intended that the scope of the invention be defined and limited only by the following claims.

What is claimed is:

1. Apparatus to process and project individual flat xerographic plates comprising, in combination, a cabinet to support and enclose elements of the apparatus, a vertically inclined chute adapted to retain a plurality of flat xerographic plates gravitationally descended one behind the other, an escapement mechanism supported below said chute adapted to arrest the lowermost of the plates on said chute and release one plate at a time therefrom, first drive means adapted to receive a plate released by said escapement mechanism and to advance the plate at a uniform speed for a predetermined distance and thereafter release the plate, a stationary corona discharge electrode supported overlying the plate path effected by said first drive means and adapted to electrostatically charge a plate surface while being advanced by said drive means, rotatable first plate support means adapted to receive and retain a plate released by said drive means, exposure means positioned and adapted to expose a pattern of light and shadow to a plate on said support means, developing means disposed above said support means and adapted to flow electroscopic developer powder over a plate on said support means, second plate support means vertically inclined and arranged in the rotatable path of said first recited support means, means operable to rotate said first support means whereby a plate after development thereof descends gravitationally from said first support means to said second support means, projection means positioned to project the developed image from a plate supported on said second support means onto a receiving member, means associated with said second support means to arrest a plate descending thereon at its projection position and operative after projection to permit the plate to descend therefrom, and conveying means disposed beneath said second support means to discharge from said apparatus a plate descended from said second support means.

2. Apparatus according to claim 1 in which said first plate support comprises a fork-like member adapted to accept and retain a xerographic plate along two opposing edges thereof while leaving the central area of the plate uncovered on both faces thereof and in which said first plate support is adapted for rotation about an axis parallel and adjacent to an unsupported edge of a plate in a plane parallel and adjacent to the plane defined by a plate supported in said support means.

3. Apparatus according to claim 2 in which said second plate support means comprises an easel-like plate support means positioned in the path of motion of said first plate support intermediate the tines of said fork-like member to intercept a plate from said first support means during the rotation thereof and to permit a full 360 degree rotation of said first plate support.

4. Apparatus according to claim 1 including an opening in said cabinet to allow insertion of a member, dimensionally equivalent to a xerographic plate, directly onto said second plate support means.

5. Apparatus according to claim 1 in which the escapement means, drive means and first support means are positioned along a single inclined plane.

6. Apparatus according to claim 1 including control means adapted to optionally advance a xerographic plate through a complete cycle including charging, exposing, developing, projecting and discharging from the apparatus and to immobilize the apparatus if either said chute is empty or the discharge means is not adapted to accept a further plate; to optionally remove a plate from said second support means and discharge it from the apparatus; and, optionally to only project an image for a predetermined time.

7. Apparatus according to claim 1 in which said projection means includes means to project a light beam at the surface of a xerographic plate in position on said second support means and to image the beam at a lens positioned at the angle of specularity of said beam reflected from said plate, said lens being positioned and disposed to image the specular reflection of the plate surface on a projected image receiving member in a wall of said cabinet.

References Cited in the file of this patent

UNITED STATES PATENTS

| | | |
|---|---|---|
| 2,883,543 | Wohl | Apr. 21, 1959 |
| 3,009,402 | Crumrine et al. | Nov. 21, 1961 |
| 3,051,041 | Lehmann et al. | Aug. 28, 1962 |

FOREIGN PATENTS

| | | |
|---|---|---|
| 723,534 | Great Britain | Feb. 9, 1955 |